(12) United States Patent
Strijker

(10) Patent No.: US 10,411,603 B1
(45) Date of Patent: Sep. 10, 2019

(54) SWITCH MODE POWER SUPPLY INCLUDING BIPOLAR ACTIVE CLAMP

(71) Applicant: NXP B.V., Eindhoven (NL)

(72) Inventor: Joan Wichard Strijker, Wijchen (NL)

(73) Assignee: NXP B.V., Eindhoven (NL)

( * ) Notice: Subject to any disclaimer, the term of this patent is extended or adjusted under 35 U.S.C. 154(b) by 0 days.

(21) Appl. No.: 16/207,018

(22) Filed: Nov. 30, 2018

(51) Int. Cl.
*H02M 3/335* (2006.01)

(52) U.S. Cl.
CPC ............... *H02M 3/33507* (2013.01)

(58) Field of Classification Search
CPC ......... H02M 3/33515; H02M 3/33569; H02M 2001/0012; Y02B 70/1433
USPC ...... 363/16–20, 21.08, 21.12, 56.03, 65, 97, 363/98, 131
See application file for complete search history.

(56) References Cited

U.S. PATENT DOCUMENTS

| | | | | |
|---|---|---|---|---|
| 5,570,278 A * | 10/1996 | Cross | ................ | H02M 3/33569 363/131 |
| 5,602,724 A * | 2/1997 | Balakrishnan | .......... | H02M 1/34 363/21.15 |
| 5,673,185 A * | 9/1997 | Albach | ................... | H02M 1/12 363/21.12 |
| 6,452,818 B1 | 9/2002 | Simopolous | | |
| 6,856,523 B2 | 2/2005 | Griffin | | |
| 8,520,410 B2 * | 8/2013 | Telefus | ............. | H02M 3/33569 363/21.02 |
| 8,687,390 B2 | 4/2014 | Koiki et al. | | |
| 10,234,880 B1 * | 3/2019 | Li | ........................... | G05F 1/571 |
| 2010/0039833 A1 * | 2/2010 | Coulson | ............ | H02M 3/33515 363/21.05 |

OTHER PUBLICATIONS

Cheng et al., "A novel interleaved flyback-type converter with ZVS operation," IEEE, 2016, pp. 1-6.
Dheeraj et al., "Comparison of active clamping circuits for isolated forward converter," 6th International Conference on Renewable Energy Research and Applications, Nov. 5-8, 2017, San Diego, CA, pp. 1-6.
Xue et al., "Design consideration of highly-efficient active clamp flyback converter using GaN power ICs," IEEE, 2018, pp. 777-782.
Liu, Pei-Hsin, "Design considerations of active clamp flyback converter with highly nonlinear junction capacitance," IEEE, 2018, pp. 783-790.

* cited by examiner

*Primary Examiner* — Rajnikant B Patel

(57) ABSTRACT

A switch mode power supply can include a bipolar device (e.g., bipolar junction transistor) connected in series with a capacitor and operable as a bipolar clamp switch where the bipolar device can be turned on by forward biasing a collector-base junction. The capacitor connected in association with the bipolar device can keep the bipolar clamp switch conductive for a limited time based on energy obtained from a transformer primary winding and stored in the capacitor when the base-collector junction bias is reversed. Storage charge properties of the bipolar clamp switch can be used to keep it conductive and working as an active clamp without requiring a high driver circuit.

20 Claims, 18 Drawing Sheets

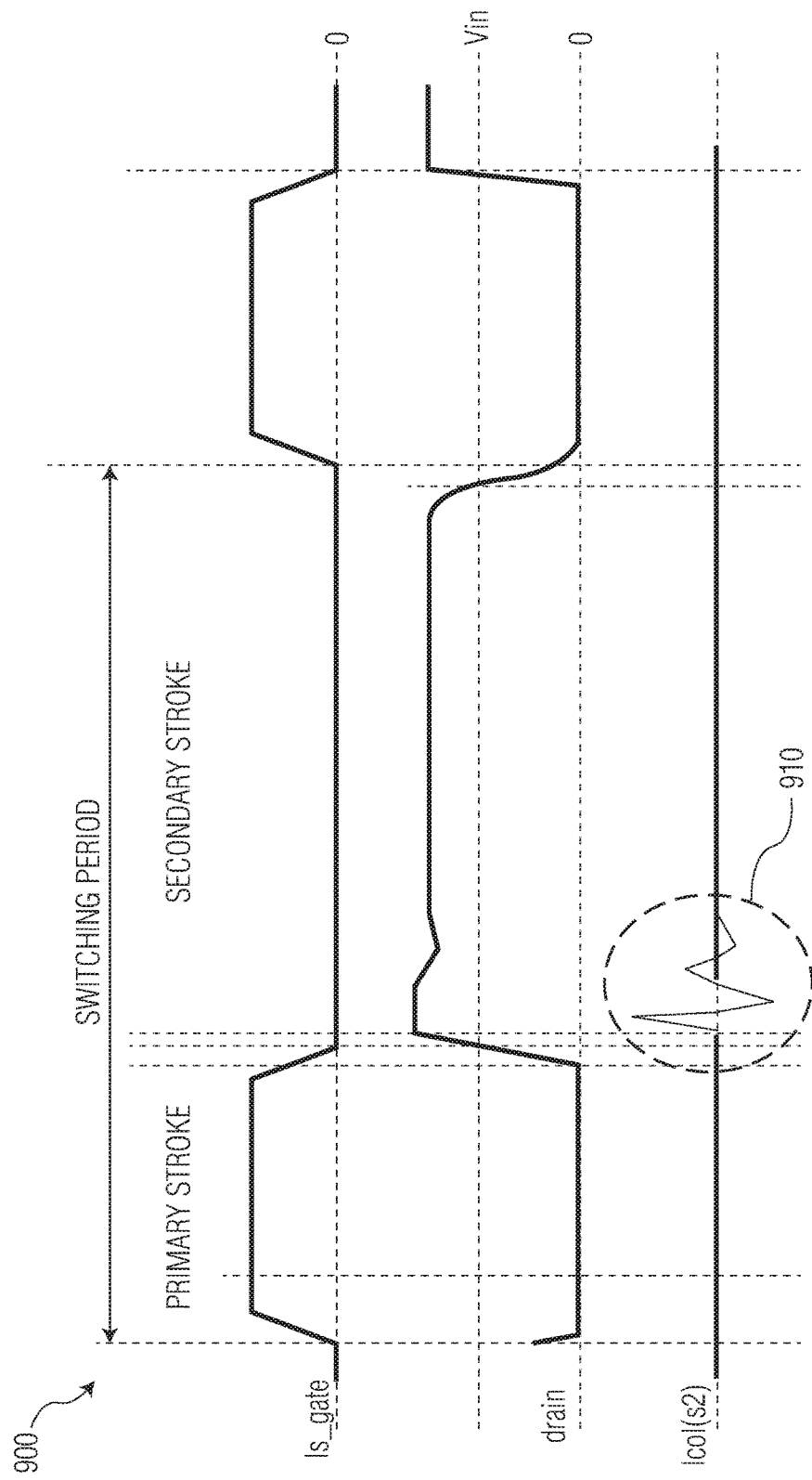

SWITCH MODE POWER SUPPLY INCLUDING BIPOLAR ACTIVE CLAMP

BACKGROUND

Power supplies are well characterized and understood, as all electronic systems require some kind of power. Still, power supply design and selection continues to challenge engineers because of the trend toward smaller size, higher efficiency, higher reliability, and greater power integrity for applications from mobile devices to line powered hardware. With high-speed data communications systems like 5G emerging, timing and noise margin requirements are becoming extreme. To address the problem of efficient and reliable power delivery in smaller form factors, power supply designers may use switch mode power supplies (SMPS) with flyback topology. Such flyback topologies (i.e., circuit designs) can be useful to power levels of up to 150 Watts, and can offer designs with a lower component count at a smaller size and at lower cost. Flyback topologies in circuit designs can also offer input/output isolation, and generally good efficiency.

An SMPS, or "switcher", is a power source that uses a switching regulator to maintain stable output voltage(s) from an AC or DC source. The switching regulator typically uses one or more semiconductor devices, such as a bipolar junction transistor, metal-oxide-semiconductor field-effect transistor (MOSFET), or insulated-gate bipolar transistor (IGBT), switching between 'On' and 'Off' states to maintain output voltage regulation. Semiconductor devices can operate with fixed 'On' time and variable frequency, or, more commonly, at a fixed frequency and variable duty cycle. High efficiency results from the low power dissipation of the switching device when it is either 'On' or 'Off'. Semiconductor devices generally dissipate power during the transitions between states. Also, because the switching frequency is generally in the tens of kilohertz, transformers, inductors, and capacitors can be much smaller, giving high volumetric efficiency.

Active clamp circuits are being used in switched mode power supplies to recycle leakage inductance losses. For off-line flyback switched mode power supplies, active clamp circuits are typically made with N-type MOSFET switch devices and include a high side driver. High side drivers can add significant cost to active clamp SMPS topologies because high side drivers generally require a level shifting circuit. High side drivers also typically call for an expensive high voltage IC technology. Off-line active clamp flyback (ACF) technology is costly because it typically uses N-type MOSFET switch devices, which are more expensive when compared to bipolar devices.

SUMMARY OF THE EMBODIMENTS

It is a feature of the embodiments to provide a bipolar device (i.e., a bipolar junction transistor) configured to operate as an active clamp switch ("bipolar clamp switch") for a switch mode power supply.

It is another feature of the embodiments to provide a bipolar device that is operable as bipolar clamp switch wherein storage charge properties of the bipolar clamp switch can be used to keep the switch mode power supply conductive and working without requiring a high side driver typically associated with active clamp switches.

It is also a feature of the embodiments to provide a bipolar device configured to operate as bipolar clamp switch wherein storage charge properties of the bipolar clamp switch can be used to keep the switch mode power supply conductive and working using the storage charge of the bipolar device as if it were an active clamp.

It is yet another feature of the embodiments to provide a bipolar junction transistor to serve as a bipolar clamp switch wherein storage charge properties of the bipolar device can be used to keep the switch mode power supply conductive and working as an active clamp for flyback topology-based switched mode power supplies as used, for example, in smart phones, in tablets, for notebook computer chargers, in routers and for media box power supplies.

It is another feature of the embodiments to use a P-type or N-type bipolar device as a bipolar clamp switch for active clamping wherein the bipolar device is turned on by forward biasing the base-collector junction and wherein the storage charge of the bipolar device will keep the switch mode power supply conductive for a limited time when the base-collector junction bias is reversed.

It is another feature of the embodiments to insert a resistor between a base and an emitter of a bipolar device serving as a bipolar clamp switch to extend charge storage time and extend the time the clamp switch is kept conductive by the storage charge. To shorten the conduction time, current for the forward biased base-collector junction of the bipolar device can be limited by deflecting part of the current from the bipolar clamp switch to another circuit that can be provided in the form of at least one or a series connection of diodes.

It is also a feature of the embodiments, to provide a method of operating a switched mode power. Accordingly, a collector-base junction of a bipolar junction transistor including a base, an emitter and a collector can be forward biased at a start of a secondary stroke of a switched mode power supply enabling current to flow from the collector to the base and a ratio of collector current to base current for the bipolar junction transistor can cause current to flow from the collector to the emitter. Then, current flowing through the bipolar junction transistor is enabled to reverse an electrical charge stored in the bipolar junction transistor when energy associated with leakage inductance in a transformer is transferred to a capacitor thereby keeping the bipolar junction transistor conductive as current flows from the emitter to the collector.

It is also a feature of the embodiments that an electrical charge stored in the bipolar junction transistor can keep the bipolar junction transistor conductive and operating as an active clamp.

It is also a feature of the embodiments that the conduction time of the bipolar junction transistor can be dependent on the electrical charge stored in the bipolar junction transistor.

It is also a feature of the embodiments that a resistor when connected to the collector and to a anode of at least one diode when the diode is further connected by its cathode to the base can operate to reduce storage time of the bipolar junction transistor by limiting collector to base current by deflecting current from the collector-base junction to the at least one diode.

It is also a feature of the embodiments that a bipolar junction transistor can be turned on to thereby operate as an active clamp circuit by forward biasing a collector-base junction associated with the bipolar junction transistor and to enable a storage charge of the bipolar junction transistor to keep the bipolar junction transistor conductive while the collector-base junction bias is reversed.

These and other embodiments will become further apparent from the detail specification, drawings and claims provided herein.

BRIEF DESCRIPTION OF THE DRAWINGS

FIG. 9 depicts exemplary signals corresponding to an active clamp flyback circuit with a bipolar device serving as a bipolar clamp switch, in accordance with an embodiment of the invention.

DETAILED DESCRIPTION

Figure 1:
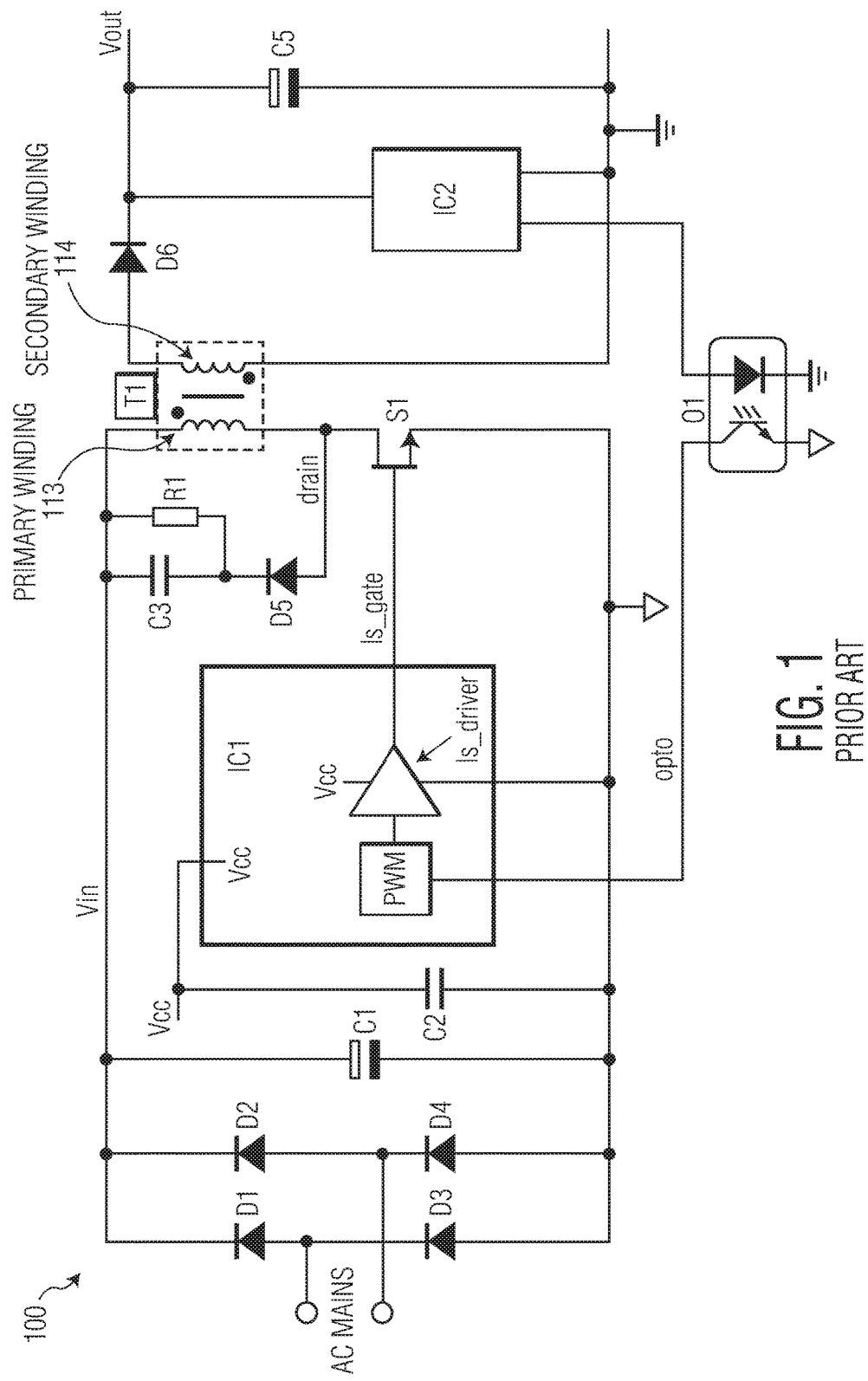
FIG. 1, labelled as prior art, depicts a circuit diagram of a currently available passive clamp flyback.

It will be readily understood that the components of the embodiments as generally described herein and illustrated in the appended figures could be arranged and designed in a wide variety of different configurations. Thus, the following more detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The present invention may be embodied in other specific forms without departing from its spirit or essential characteristics. The described embodiments are to be considered in all respects only as illustrative and not restrictive. The scope of the invention is, therefore, indicated by the appended claims rather than by this detailed description. All changes that come within the meaning and range of equivalency of the claims are to be embraced within their scope.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussions of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment", "an embodiment", or similar language means that a particular feature, structure, or characteristic described in connection with the indicated embodiment is included in at least one embodiment of the present invention. Thus, the phrases "in one embodiment", "in an embodiment", and similar language throughout this specification may, but do not necessarily, all refer to the same embodiment.

What is needed in the power supply art are improved clamping circuits for switch mode power supplies that can efficiently and less expensively recycle leakage inductance losses. A bipolar switch device operating as an active clamp device will now be described wherein storage charge properties of the bipolar device can be used to keep the switch conductive and working as if it is an active clamp without requiring a driver circuit. Current solutions are not known to utilize the storage charge of a bipolar switch for active clamp action.

Referring to FIG. 1, labeled as Prior Art, a schematic diagram of a prior art passive clamp flyback circuit 100 is illustrated. In applications without an active clamp, the energy from the leakage inductance is typically dissipated in a resistor, R1. The resistor capacitor diode (RCD) clamp generally includes a diode D5, capacitor C3 and resistor R1. Applications using passive RCD clamps are typically provided at a lower cost compared to active clamp solutions, can yield a lower efficiency because leakage energy is dissipated rather than being recycled. Besides an efficiency advantage, an active clamp flyback circuit design can typically also result in a lower peak drain voltage and less high frequency ringing.

Figure 2:
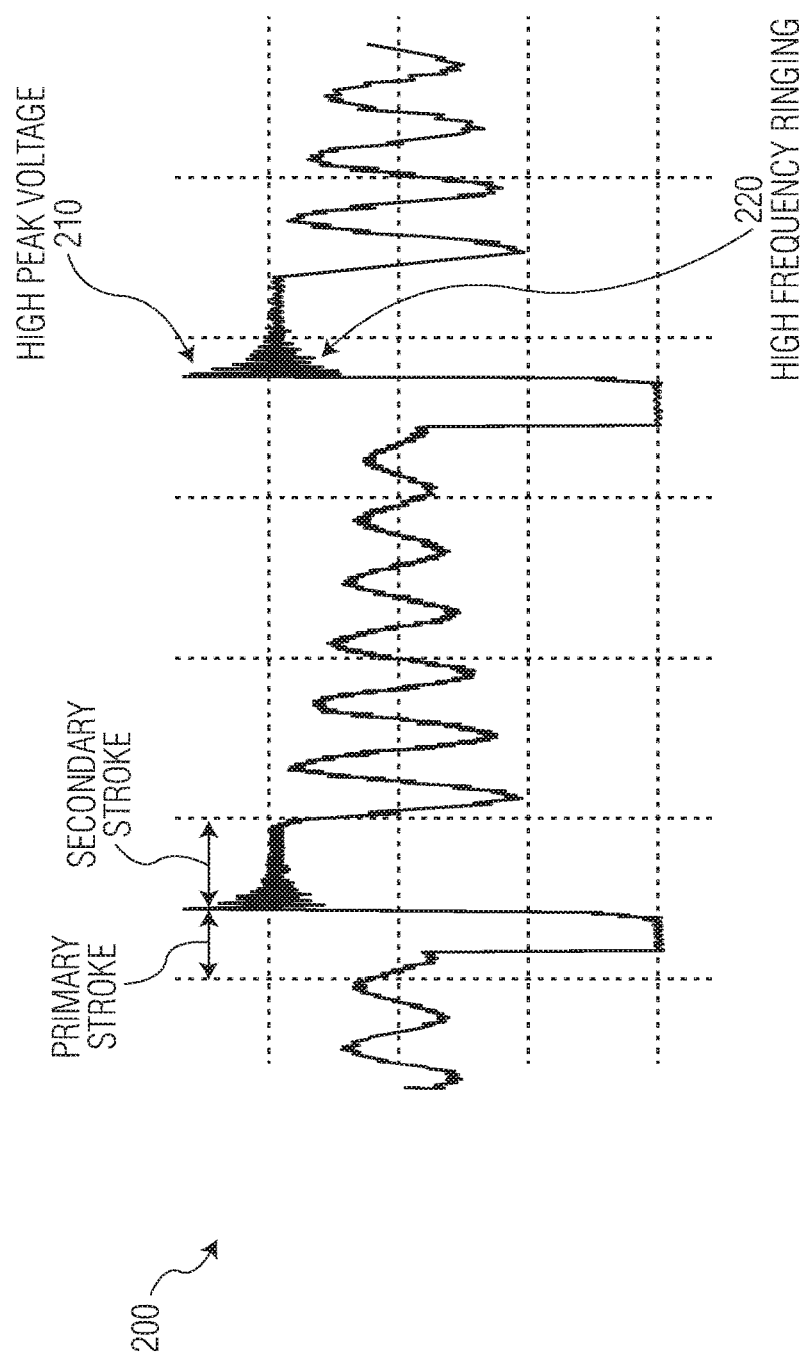
FIG. 2 depicts an example signal corresponding to a prior art resistor capacitor diode (RCD) clamp drain voltage circuit design as depicted in FIG. 1.

FIG. 2 graphically depicts an example signal corresponding to the prior art passive RCD clamp drain voltage circuit design as depicted in FIG. 1. In FIG. 2 the drain voltage of a flyback SMPS circuit with an RCD clamp is shown. At the start of the secondary stroke, a high peak voltage 210 and a high frequency ringing signal 220 is present. The high peak voltage 210 (e.g. 10 MHz) requires a higher breakdown voltage rating for S1. The high frequency ringing signal 220 increases electromagnetic interference (EMI).

Figure 3:
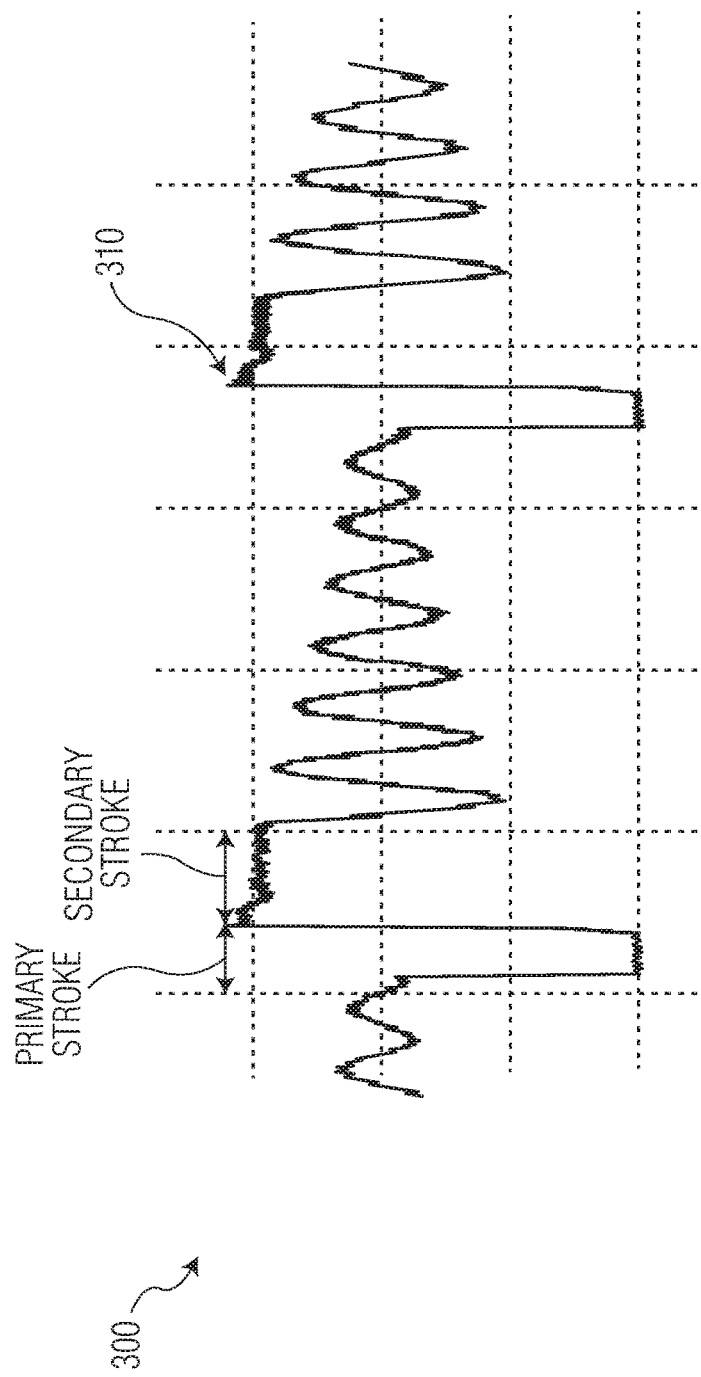
FIG. 3 depicts an example signal for a PNP clamp drain voltage circuit design.

Referring to FIG. 3, an example of the drain signal is provided in graph 300, but now including the influence of an active clamped flyback. A drain voltage spike 310 is shown to have been reduced significantly, and furthermore high frequency ringing is no longer present when compared to FIG. 2, resulting in lower EMI.

Figure 4:
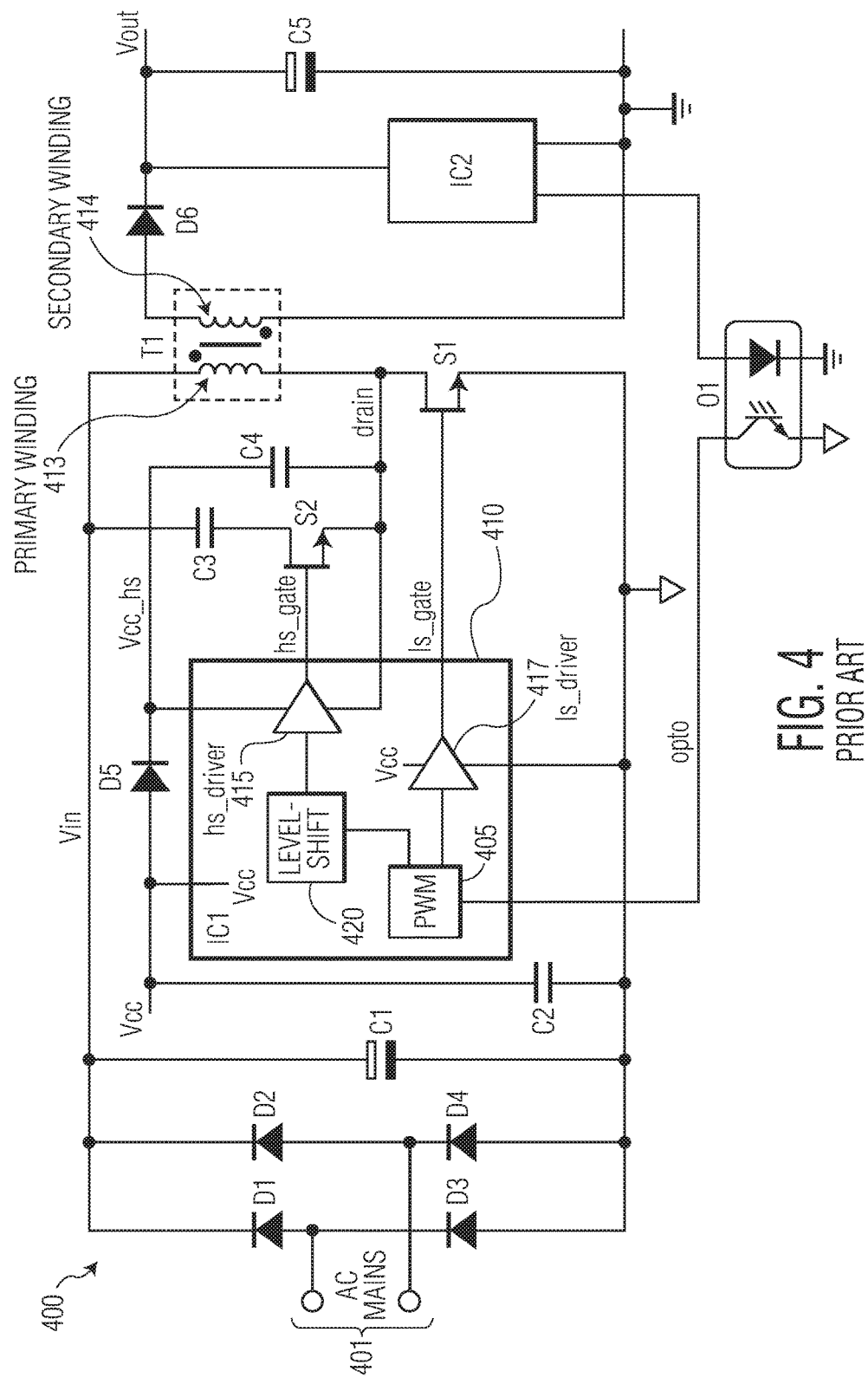
FIG. 4, labelled as prior art, depicts a circuit diagram of an active camp flyback (ACF) circuit design that can be used to recycle energy in leakage inductance from a transformer associated with the active clamp flyback circuit.

Referring to FIG. 4, labelled as Prior Art, depicted is a schematic diagram of an ACF circuit 400 design (active camp flyback circuit). The ACF circuit 400 can include a control IC 410, IC1, which operates to manage recycling of energy from the leakage inductance of a transformer, T1. In T1 the primary winding 413 and secondary winding 414 can be coupled via mutual inductance provided by T1. This coupling can be imperfect. The leakage inductance can store some energy during the switching of the converter that may not be transferred to the secondary side. The control IC 410, IC1, can further include a high side driver 415 (hs diver), a low side driver 417 (ls driver) and a level shifter 420. In addition to the control IC 410, the ACF circuit 400 can include active clamp circuitry that can include a clamp capacitor C3, a clamp switch S2 that can be connected between control IC 410 and a first end connection of the primary winding 413 of transformer, T1. The second end connection of the primary winding 413 is shown being connected to Vin.

During operation, control IC 410 can manage the transfer of energy in the form of leakage inductance from the primary winding 413 at T1 to the clamp capacitor, C3, at the start of a secondary stroke in the ACF circuit 400 and then release this energy to the output at the secondary winding 414 through transformer, T1, during the rest of the secondary stroke. Main AC inputs 401, supplying the ACF circuit 400, can be connected via bridge rectifier diodes, D1, D2, D3 and D4 to an input storage capacitor C1. Control IC 410 drives MOSFET switches S1 and S2 from a pulse width modulator 405 (PWM). The PWM drives S1 and S2 alternatively: when S1 is made conductive, S2 is made non-conductive. When S2 is conductive, S1 is non-conductive. Typically, a small time period exists between switching one switch to non-conductive and the other to conductive when both switches are non-conductive. This often-called "non-overlap time" is implemented to prevent an undesirable shoot through state. S1 is driven by the low side driver 417. The high side driver 415 through level shifter 420 drives S2. The level shifter 420 is implemented because the high side driver 415 references to the drain voltage rather than to ground. The Control IC 410 is supplied by a supply voltage $V_{cc}$. The high side driver 415 is supplied by supply voltage $V_{cc}$_hs. High side supply capacitor, C4, is charged through diode D5 after S1 is conductive and the drain voltage drops to zero volts. The energy is then transferred to the output capacitor C5 via transformer T1 and rectifier diode D6 during the secondary stroke of the converter. The output voltage can be controlled by IC2 via optocoupler, O1. The input side and the output side of the AFC circuit 400 are electrically isolated by T1 and O1.

Figure 5:
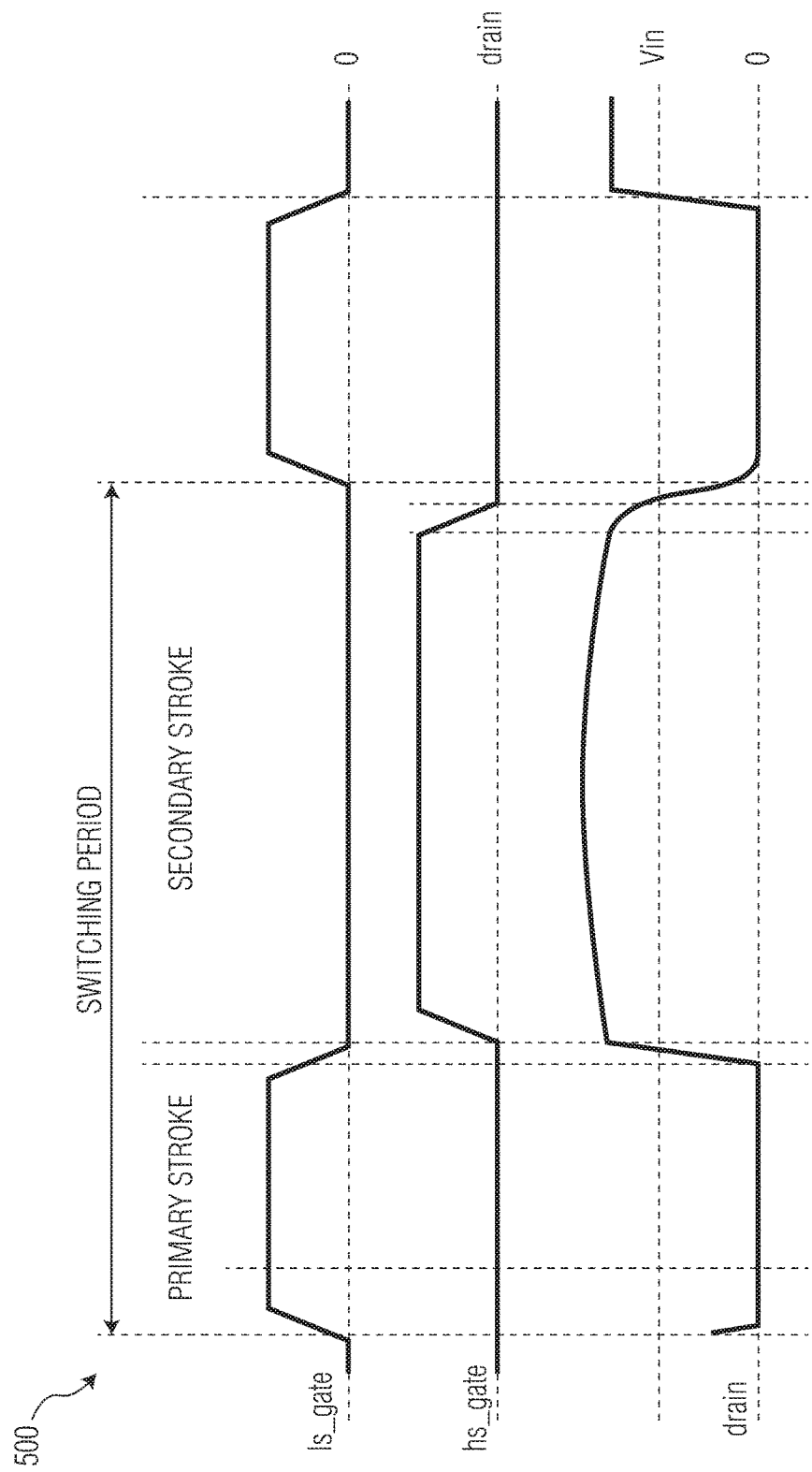
FIG. 5, labelled as prior art, depicts example signals corresponding to an active clamp flyback circuit.

Referring to FIG. 5, labelled as Prior Art, depicted is a graph 500 with example signals corresponding to the ACF circuit 400. The relevant signals drawn are for an ls_gate, an hs_gate and a drain. Note that the hs_gate signal references to the drain: the low level is not ground (0), but the drain voltage. During the time the ls_gate is high, energy is stored in the transformer T1. After the is gate has switched to zero, the hs_gate is shown to be high and energy stored in T1 is shown being transferred to the secondary stroke side. The energy that was stored in the leakage inductance is shown being transferred to the clamp capacitor C3 during the start of the secondary stroke. Because S2 is made conductive by the high hs_gate signal, the energy that was transferred to C3, is shown transferred to the output during the rest of the secondary stroke.

Figure 6:
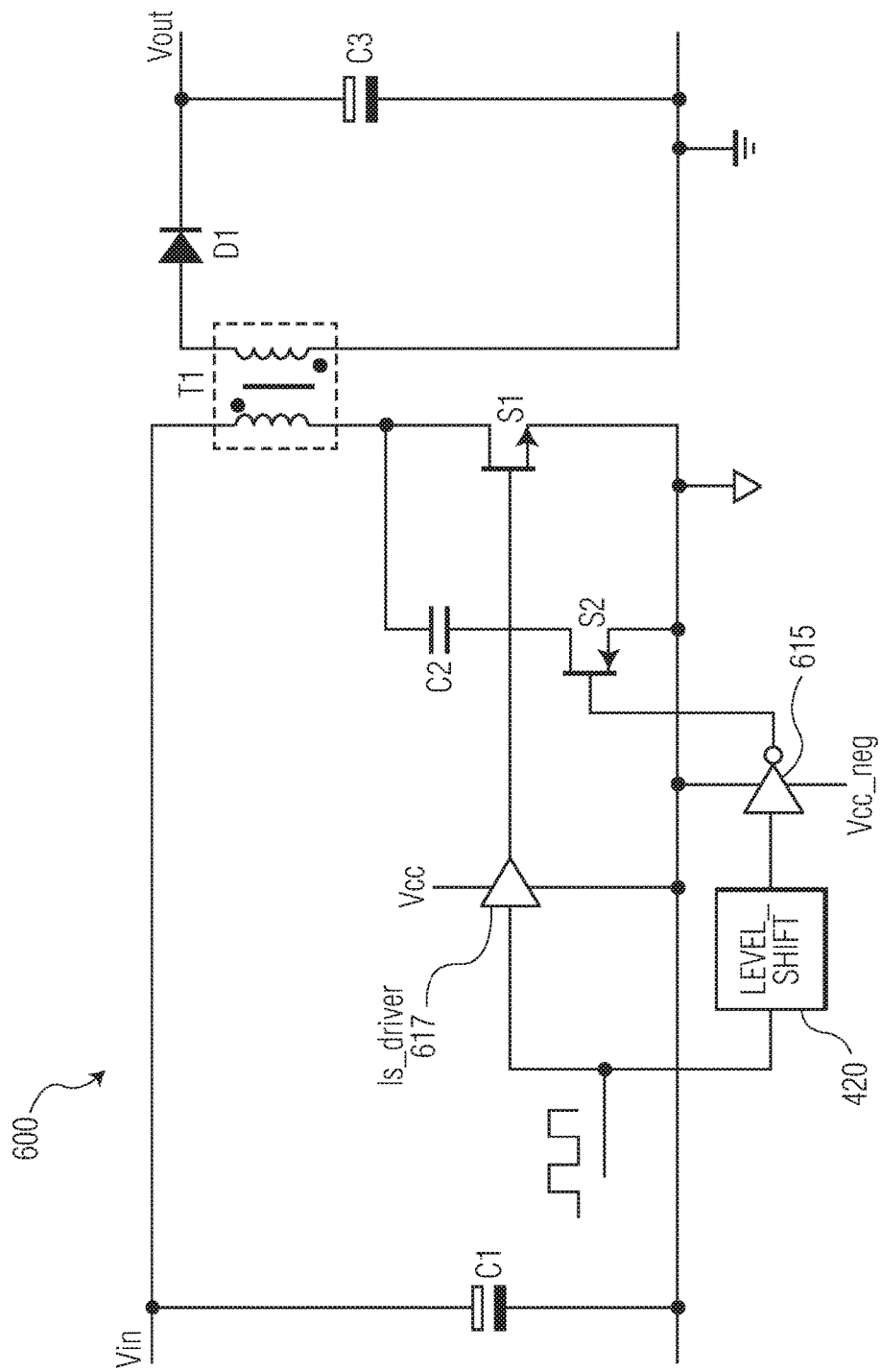
FIG. 6, labelled as prior art, depicts a circuit diagram of a low side active clamp with a negative supply voltage.

Referring to FIG. 6, labelled as Prior Art, depicted is a circuit diagram of a low side active clamp 600 with a negative supply voltage. The low side switch, S1, is driven by the low side driver 617. The clamp switch, S2, is now a P-type switch. The driver 615 for S2 outputs a negative voltage with respect to ground to make S2 conductive. An additional negative supply voltage, $V_{cc\_neg}$, and a level shifter 420 are once again used for this type of driver.

Figure 7:
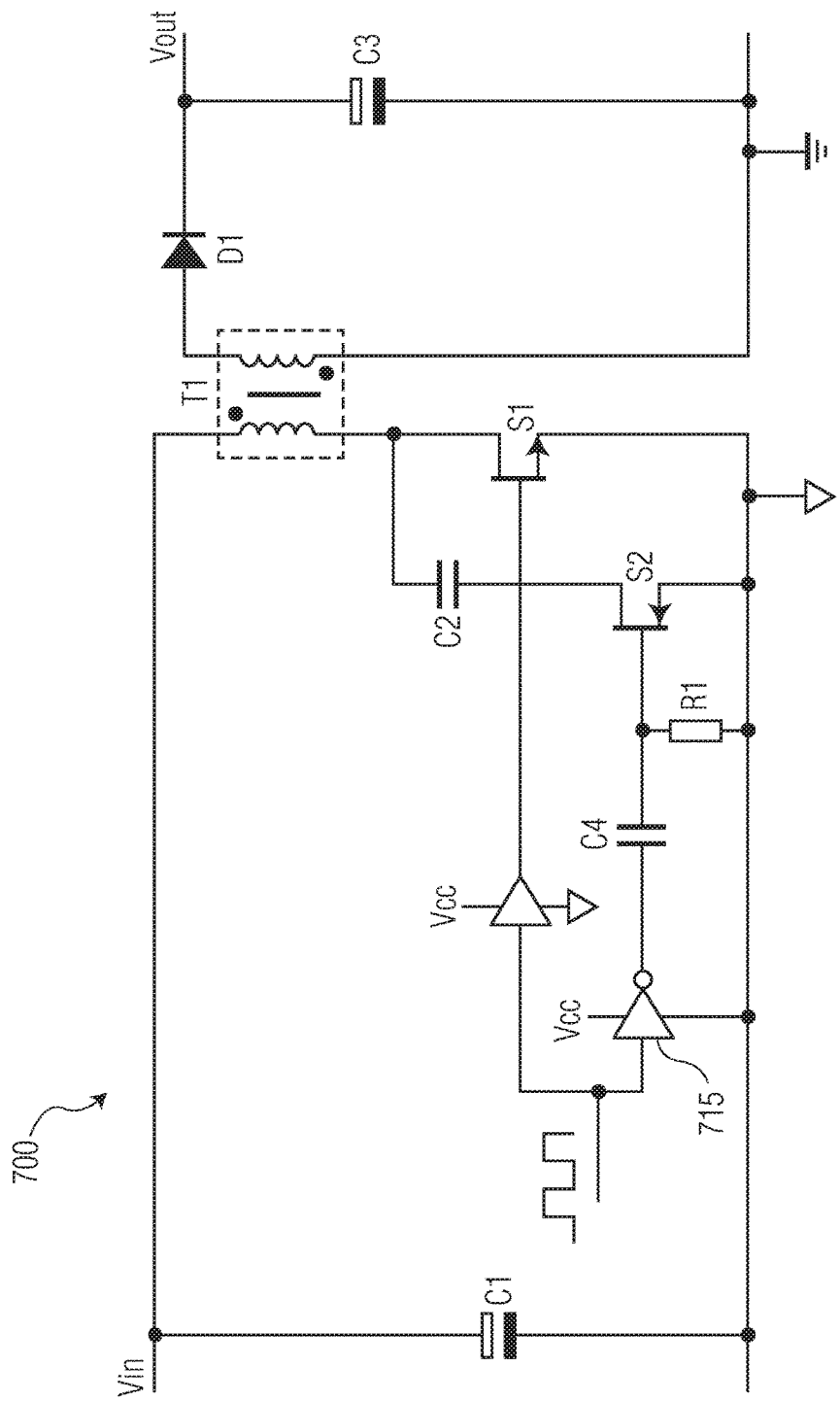
FIG. 7, labelled as prior art, depicts a circuit diagram of a capacitive coupled low side active clamp.

A low side active clamp flyback converter circuit 700 is illustrated in FIG. 7, which is also labelled as Prior Art. To overcome the need for a negative supply voltage, the P-type clamp switch, S2, can be capacitively coupled by capacitor, C4, to a driver 715. Although a negative supply voltage is not used, additional components, C4 and R1, are added for level shifting. P-type MOSFET devices are rarely used for high voltage applications because P-type high voltage MOSFETs are much more expensive than N-type high voltage MOSFETs. P-type high voltage bipolar junction transistors, however, are much less expensive than MOSFET devices and are comparable to N-type high voltage BJTs. Prior solutions use a driver to control the active clamp switch and also need level shifting either by an active silicon level shifter or capacitively using a capacitor.

Charge-storage effects determine the speed of semiconductor devices such as BJTs. In most situations charge-storage effects deteriorate performance as charge-storage effects reduce the maximum switching speed. Charge-storage, however, can be used to an advantage for the present embodiments.

Figure 8A:
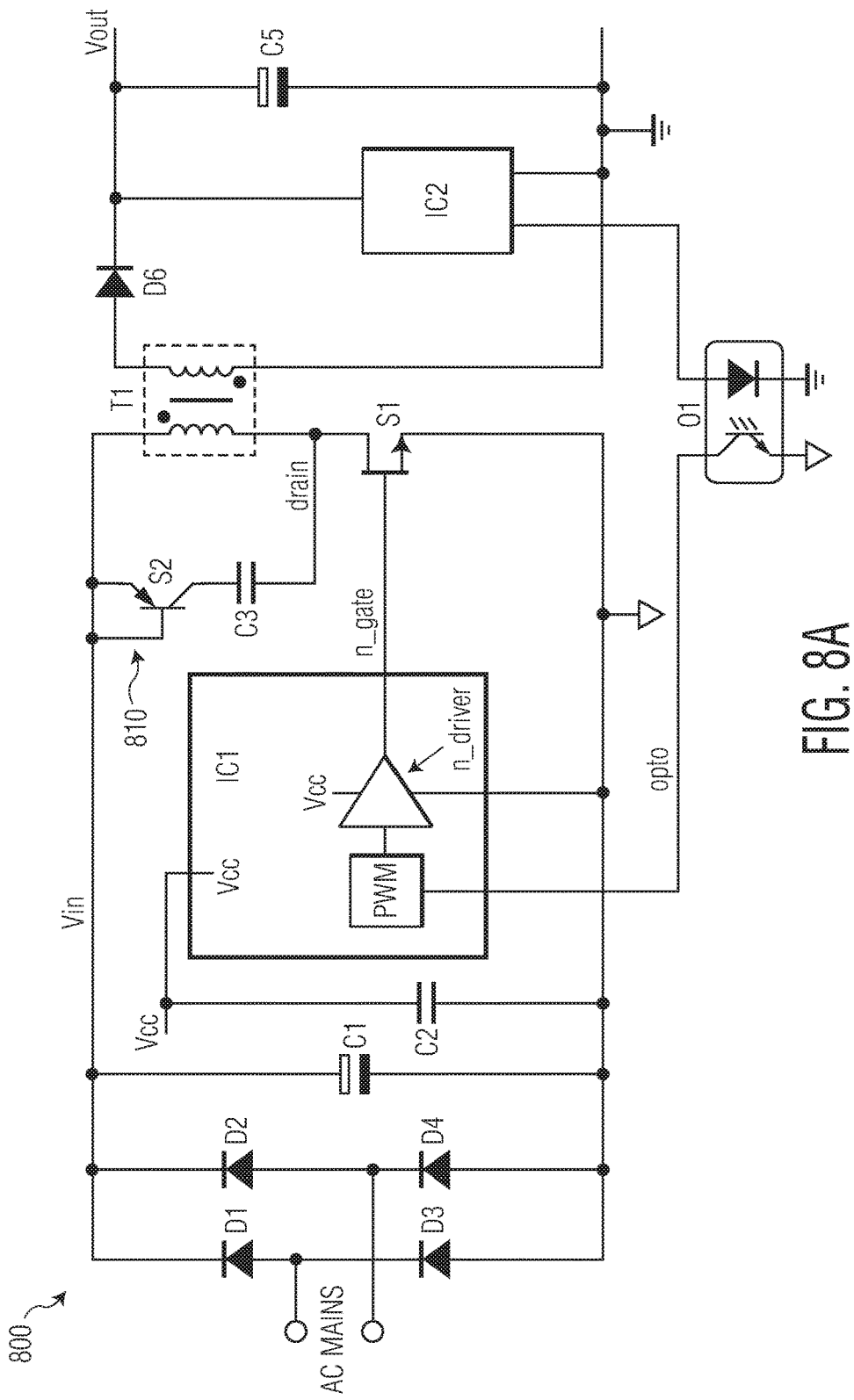
FIG. 8A depicts a circuit diagram of an active clamp flyback circuit using a P-type bipolar device serving as a bipolar clamp switch, in accordance with an embodiment of the invention.

Referring to FIG. 8A a schematic diagram of an active clamp circuit 800 according to features of the embodiments is illustrated. Here, bipolar clamp switch S2 can be provided in the form of a P-type high voltage bipolar junction transistor (BIT) device and is shown disposed in parallel with primary windings of T1 and has a shorted base-emitter connection 810, with both the base and the emitter being tied to $V_{in}$. Bipolar clamp switch S2 can be provided in the form of, e.g., Nexperia PBHV9560 or ST STN9260 or STN9360. A capacitor, C3, can be disposed between the bipolar clamp switch's S2 collector and a first end connection of the primary winding of T1. A second end connection of T1 is shown connected to Vin.

Figure 8B:
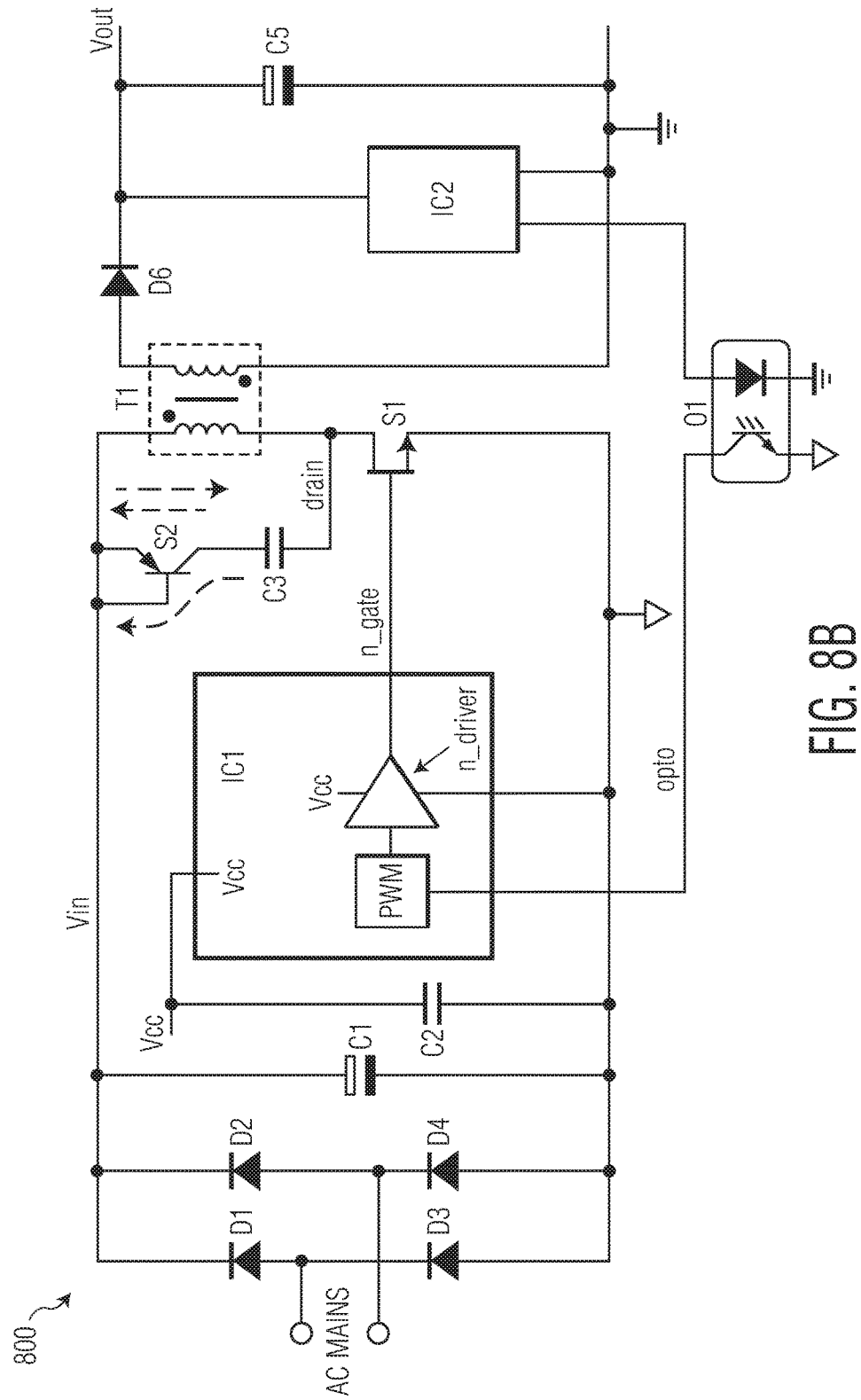
FIG. 8B depicts current flow in the active clamp flyback circuit using a P-type bipolar device of FIG. 8, in accordance with an embodiment of the invention.

As illustrated in FIG. 8B, a schematic diagram of the active clamp circuit 800 is illustrated again showing the paths for the active clamp current associated with bipolar clamp switch S2 depicted by three dashed lines. Referring to FIG. 9, a graph 900 with an example of signals for the active clamp circuit 800 depicted in FIG. 8A is illustrated. At the start of the secondary stroke shown in FIG. 9, the collector-base junction is forward biased and current initially flows from the collector to the base, as shown by the first dashed line shown flowing upward from collector to the shorted base located at the left of S2 in FIG. 8B. The reverse hfe (ratio of collector current to base current) of the bipolar transistor used for S2 can also cause some current to flow from the collector to the shorted emitter, as shown by the second dashed arrow flowing upward located at the right of S2 in FIG. 8B. When energy of the leakage inductance is transferred to the clamp capacitor, C3, which is represented by the primary stroke in FIG. 9, then the current direction through S2 reverses. Although the base-emitter connection is shorted, the base storage charge stored in C3 can keep the transistor conductive for some time as current flows from emitter to collector as shown by the third dashed arrow, which is shown flowing downward and is located to the right of S2 in FIG. 8A.

Typically, a small current ringing signal 910 is present after the initial positive and negative current pulse, as shown in FIG. 9. Ringing can be caused by the resonance of the leakage inductance and the clamp capacitor C3. After the recombination of the storage charge in the base region of the bipolar clamp switch S2, the bipolar clamp switch S2 will become non-conductive again. For high voltage P-type bipolar devices such as BJTs, the storage charge can be too large to allow high frequency switching operation of the SMPS. The storage time should be smaller than the length of the secondary stroke: bipolar clamp switch S2 should be non-conductive at the moment S1 is made conductive at the next primary stroke.

Figure 10:
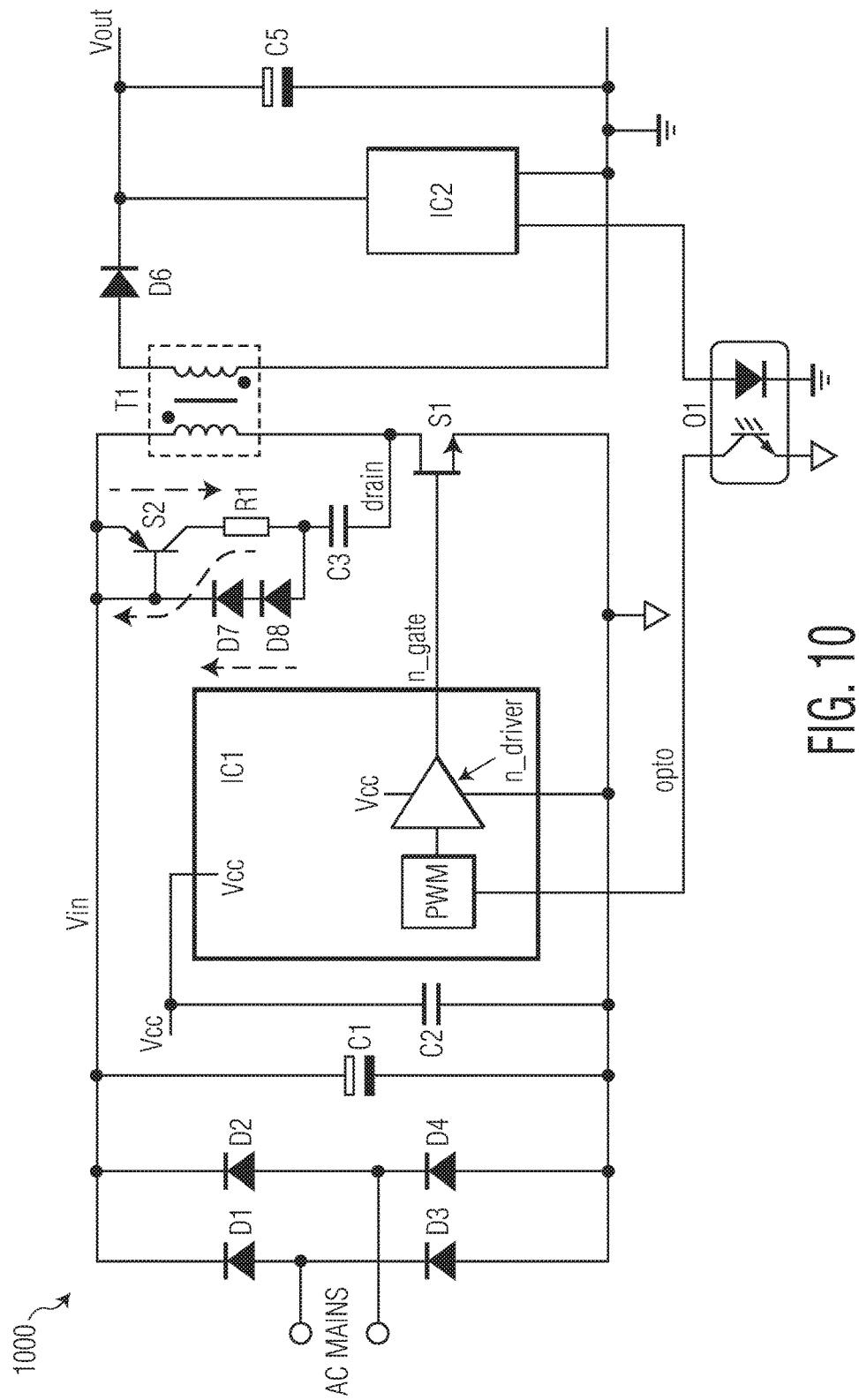
FIG. 10 depicts a circuit diagram of an active clamp flyback circuit having a P-type bipolar device serving as a bipolar clamp switch with an additional resistor and diodes connected to the bipolar device to reduce its storage time, in accordance with an embodiment of the invention.

Referring to FIG. 10, depicted is a schematic diagram of an active clamp flyback circuit 1000 having a P-type bipolar device configured to act as a bipolar clamp switch S2 with an additional resistor, R1, connected between the capacitor C3 and the collector, and diodes, D7 and D8 connected in series between capacitor C3 and the base, to reduce storage time. At least one diode can be connected by its cathode to the base, with the diode's anode connected to capacitor C3. To limit the charge storage time, diodes D7 and D8 together with resistor R1 can be implemented to limit the collector to base current as illustrated in FIG. 10. Part of the current can be deflected from the collector-base junction to the diodes D7 and D8, as shown by the dashed lines flowing upward and located to the left of D7 and D8. When the collector-base junction is conductive, the voltage across resistor R1 is equal to:

$$U(R1)=U(D7)+U(D8)-Ucb,$$

in which U(D7) and U(D8) is the forward voltage drop of D7 and D8 Ucb is the forward voltage drop of the collector-base junction of S2. The current through the collector-base junction can then be:

$$Icb=U(R1)/R1,$$

in which R1 is the resistance value of R1. If U(D7), U(D8) and Ucb are diodes voltages of about 0.7V, the collector-base junction current can be:

$$Icb=0.7V/R1.$$

So, the resistance value of R1 can be used to set the maximum collector base current and maximum storage time. The solution depicted in FIG. 10 can be used with an N-type BJT as well as with a P-type BJT.

Figure 11:
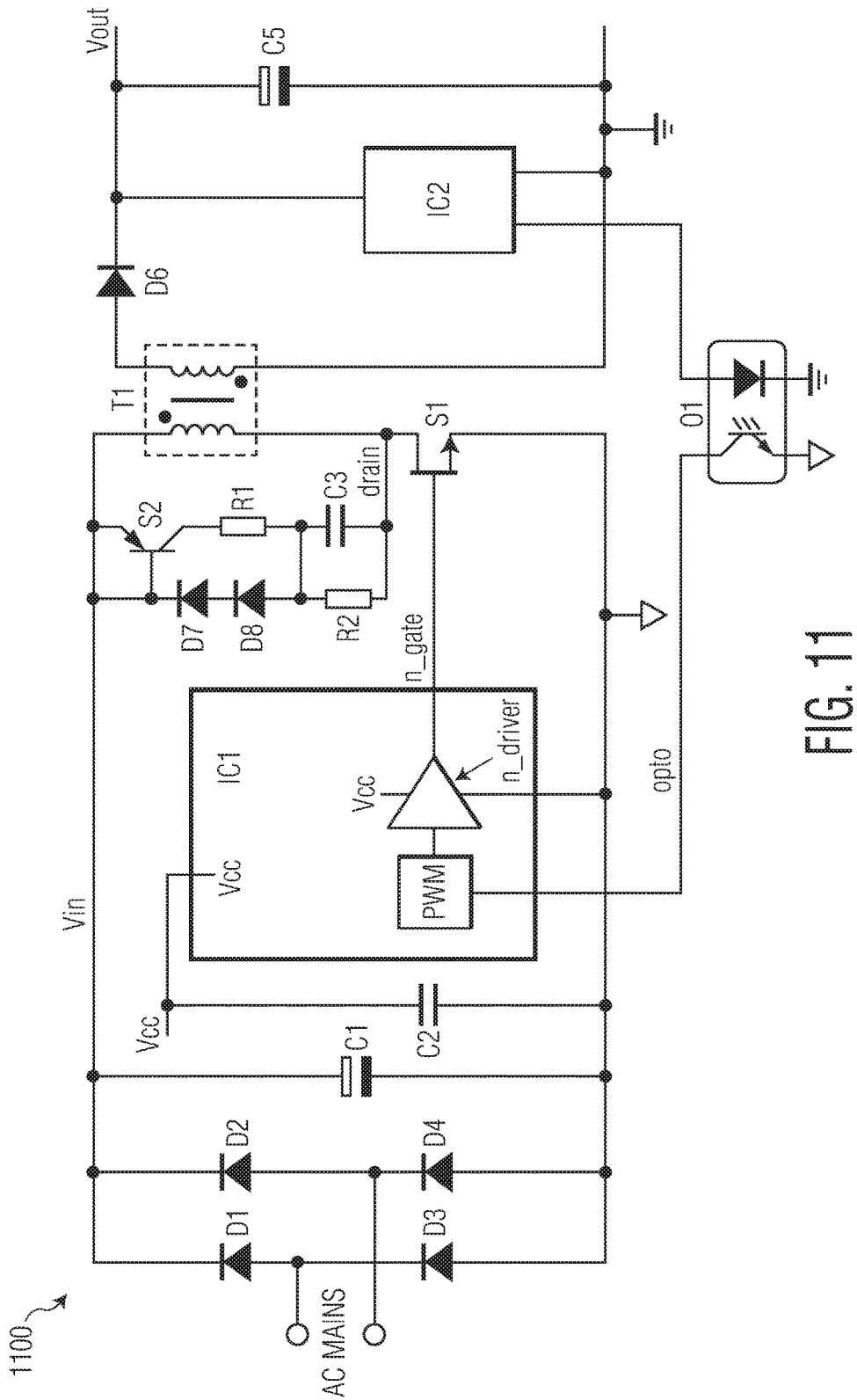
FIG. 11 depicts a circuit diagram of an active clamp flyback circuit having a P-type bipolar serving as a bipolar clamp switch device having an additional resistor, R1, diodes, D7 and D8, connected to the bipolar device to reduce its storage time, and resistor R2 and capacitor C3 connected in between the bipolar device and a transformer for managing DC bias, in accordance with an embodiment of the invention.

FIG. 11, depicted is a schematic diagram of an active clamp flyback circuit 1100 using a bipolar clamp switch S2 with an additional resistor, R1, and diodes, D7 and D8, to reduce storage time and a resistor R2 for controlling DC bias. Resistor R2 can be added in parallel to clamp capacitor C3. If the clamp capacitor C3 is charged such that the voltage level is too high, then the collector-base junction will not be forward biased anymore at the start of the secondary stroke. Then the drain voltage of S1 will no longer be clamped. To solve this condition, Resistor R2 can be chosen with high-Ohmic value and that can be connected in parallel to clamp capacitor C3. R2 can be for example 1 mega-ohm in value. Should only one diode (D7 or D8) be used, the diode can be connected to the base by its cathode, and the diode can be connected by its anode to an end (a first end or second end) of the resistor R2.

Figure 12:
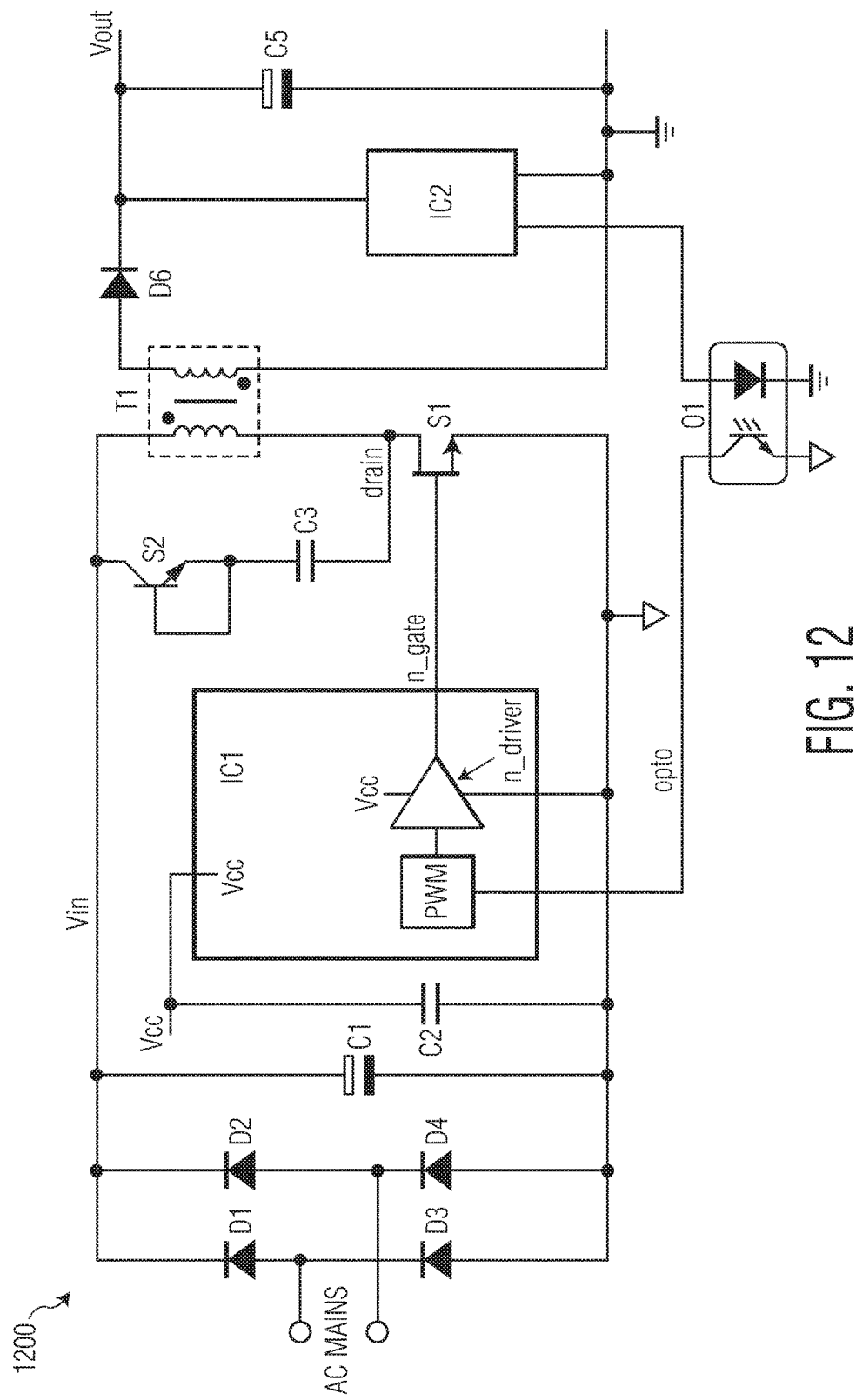
FIG. 12 depicts a circuit diagram of an active clamp flyback circuit having an N-type bipolar device serving as a bipolar clamp switch, in accordance with an embodiment of the invention.

Referring to FIG. 12, depicted is a schematic diagram of an active clamp flyback circuit 1200 having an N-type bipolar device serving as a bipolar clamp switch, S2. The operation of this circuit is similar to the operation for a P-type bipolar device. Here, the base and collector terminals of bipolar clamp switch S2 are shorted. At the start of the secondary stroke the base-collector junction will be forward biased, creating storage charge in the base region of the bipolar clamp switch S2. This storage charge will keep bipolar clamp switch S2 conductive some time after the polarity of the current reverses. Typically, storage time of N-type BJTs is much smaller than P-type BJTs.

Figure 13:
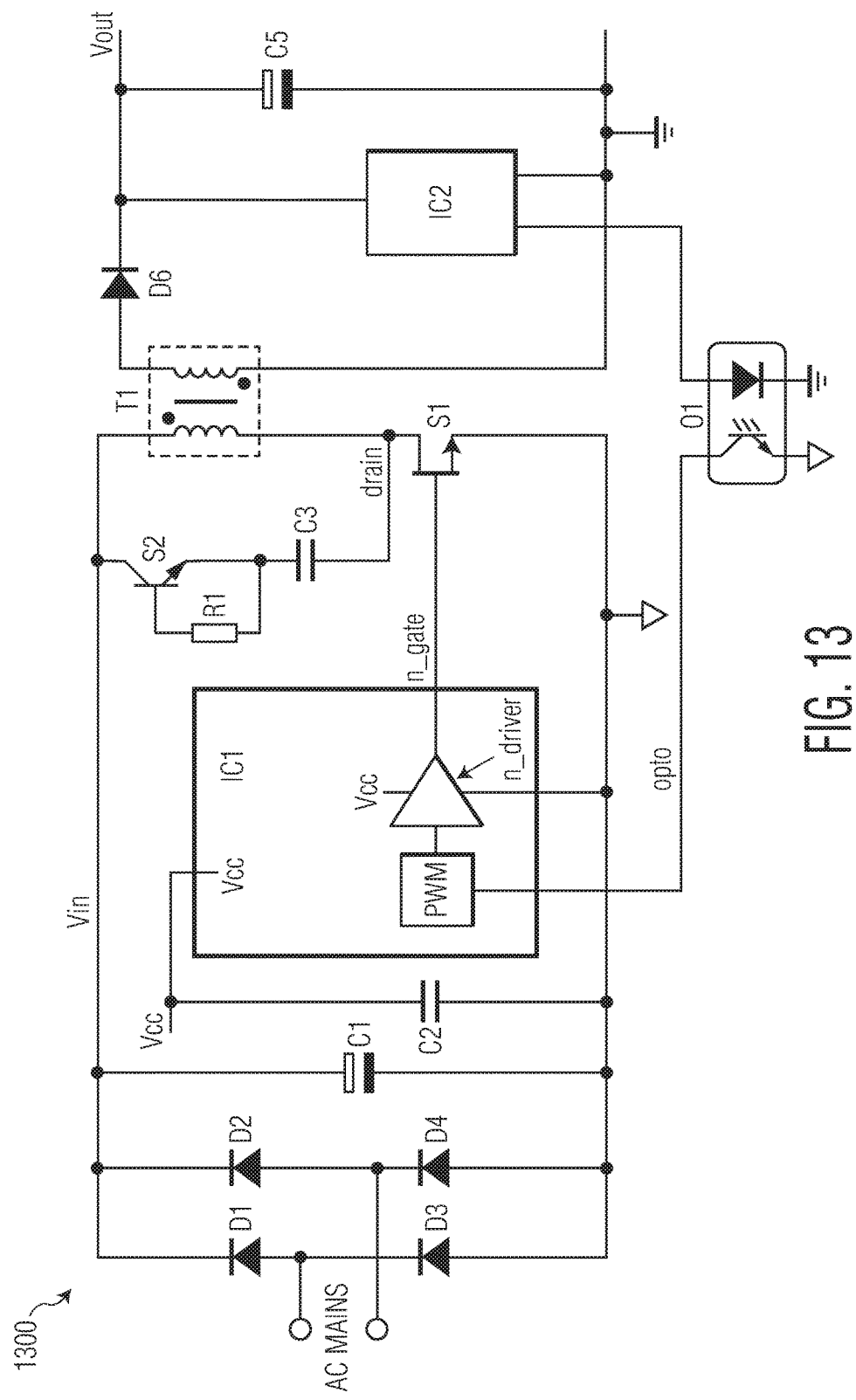
FIG. 13 depicts a circuit diagram of an active clamp flyback circuit having an N-type bipolar device serving as a bipolar clamp switch and an additional resistor, R1, connected to the bipolar device to extend its storage time, in accordance with an embodiment of the invention.

Referring to FIG. 13, depicted is a schematic diagram of an active clamp flyback circuit 1300 using an N-type bipolar device as a bipolar clamp switch S2 and an additional resistor, R1. To reduce storage time resistor, R1, is inserted as the base-emitter connection of the bipolar clamp switch rather than a complete shorting of the base-collector as shown in FIG. 12. This resistor can be low-Ohmic (e.g. 1 Ohm) and can extend the time bipolar clamp switch S2 is kept conductive by the storage charge. Dependent on the storage time of the BJT and the desired conduction time, the conduction time can be extended by adding R1 between the base and the collector of bipolar clamp switch S2, or can be reduced by limiting the base current of S2 as shown in FIG. 10.

Figure 14:
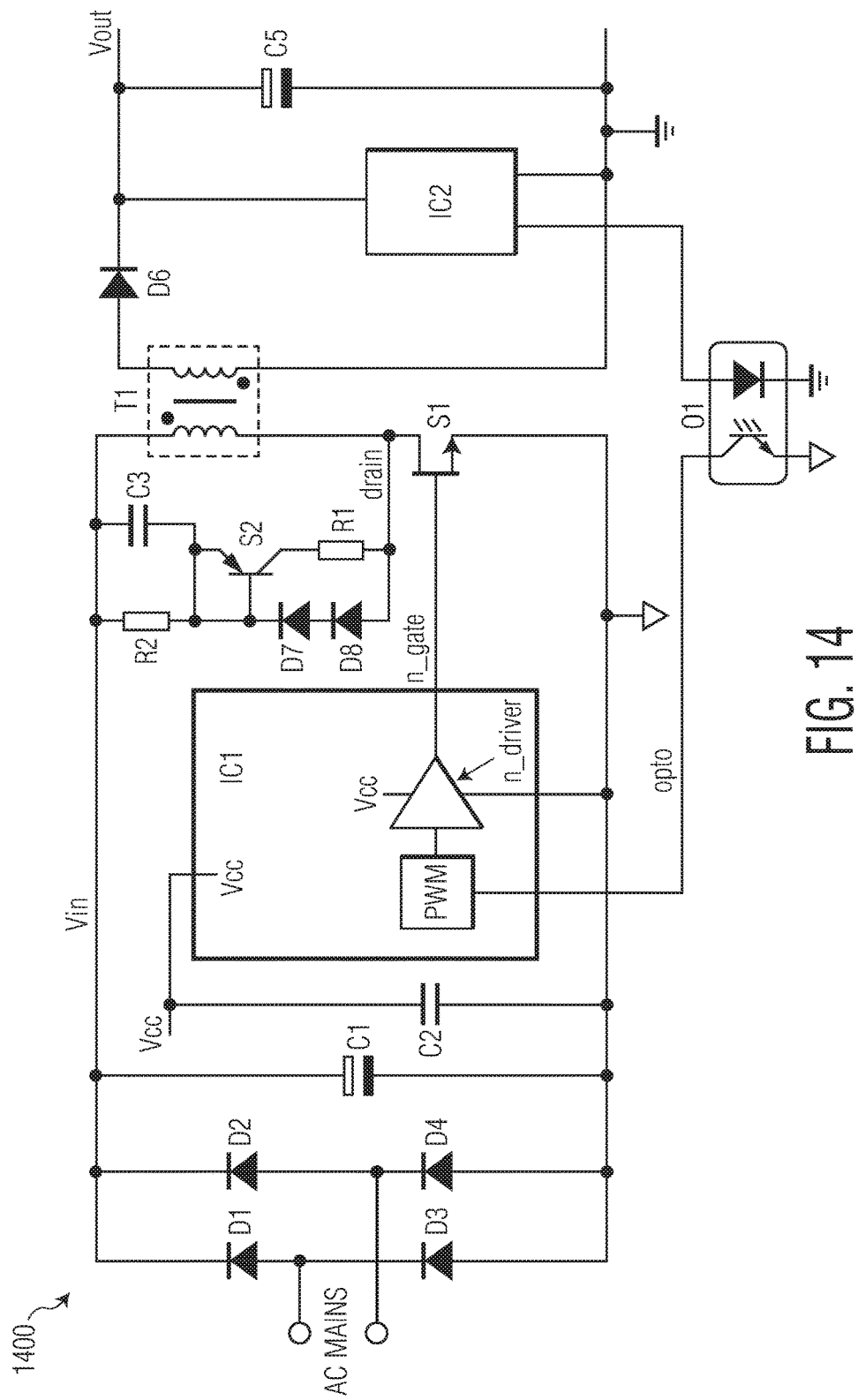
FIG. 14 depicts a circuit diagram of an active clamp flyback circuit having a P-type bipolar device serving as a bipolar clamp switch and an additional resistor, R1, and diodes, D7 and D8 connected to the bipolar device to reduce its storage time, and resistor R2 for DC bias, which is similar in appearance to the circuit diagram of FIG. 11 but with the order of components C3 and S2 reversed, in accordance with an embodiment of the invention.

Other connections are also possible. Referring to FIG. 14, depicted is a schematic diagram of an active clamp flyback (ACF) circuit 1400 having a P-type bipolar device as the bipolar clamp switch, S2, additional resistor, R1, and diodes, D7 and D8, to reduce storage time, and resistor R2 for DC bias. The ACF circuit 1400 is similar to the circuit diagram of FIG. 11, but the order of components C3 and S2 can be reversed with clamp capacitor C3 being tied to $V_{in}$. The position can be reversed because S2 and C3 are in series. So C3 can be connected to $V_{in}$, while S2 can be connected between the other terminal of C3 and the drain node, as shown in FIG. 14.

Figure 15:
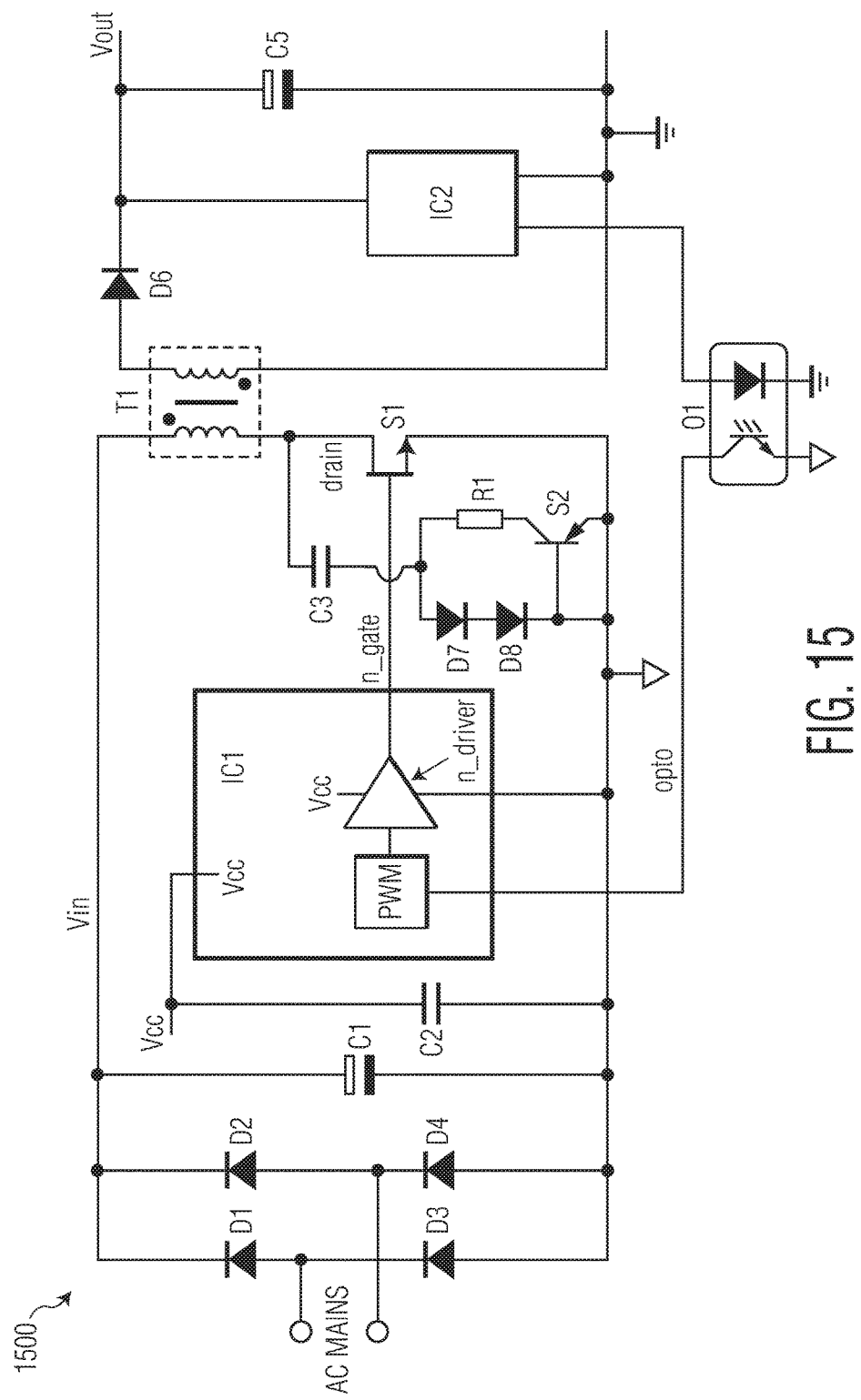
FIG. 15 depicts a circuit diagram of an active clamp flyback circuit having a P-type bipolar device serving as a bipolar clamp switch and an additional resistor, R1, and diodes, D7 and D8 connected to the bipolar device to reduce its storage time, which is similar in appearance to the circuit diagram of FIG. 11 but with the series of components C3 and S2 tied to the source terminal for S1, in accordance with an embodiment of the invention.

Referring to FIG. 15, depicted is another schematic diagram of an ACF circuit 1500 having a P-type bipolar device as its bipolar clamp switch S2, and an additional resistor, R1, and diodes, D7 and D8, to reduce storage time. Once again, the circuit is similar in appearance to the circuit diagram of FIG. 11, however components C3 and S2 can be tied to ground rather than to V$_{in}$. Connection to ground is possible because C3 does not conduct DC current, therefore the clamp can be connected to any suitable node.

Figure 16:
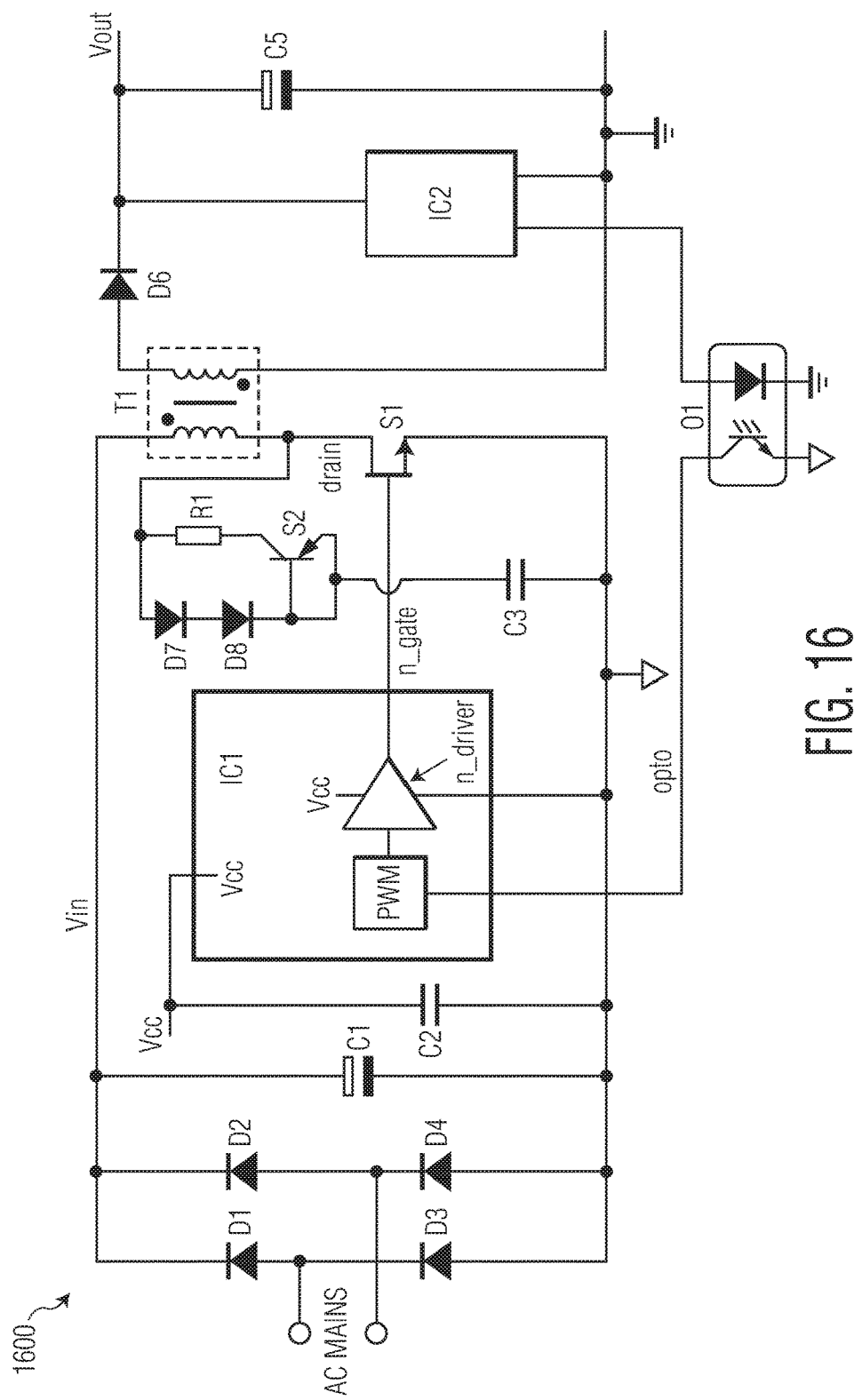
FIG. 16 depicts a circuit diagram of an active clamp flyback circuit having a P-type bipolar device acting as a bipolar clamp switch and an additional resistor, R1, and diodes, D7 and D8 connected to the bipolar device to reduce storage time, which is similar in appearance to the circuit diagram of FIG. 15 but with the order of components C3 and S2 reversed, in accordance with an alternate embodiment of the invention.

Referring to FIG. 16, depicted is yet another schematic diagram of an ACF circuit 1600 having a P-type bipolar device as its bipolar clamp switch S2 and an additional resistor, R1, and diodes, D7 and D8, to reduce storage time. Once again, the circuit is similar in appearance to the circuit diagram of FIG. 15, but the order of components C3 and S2 can be reversed and C3 can be tied to ground as discussed with respect to the circuit in FIG. 15.

Figure 17:
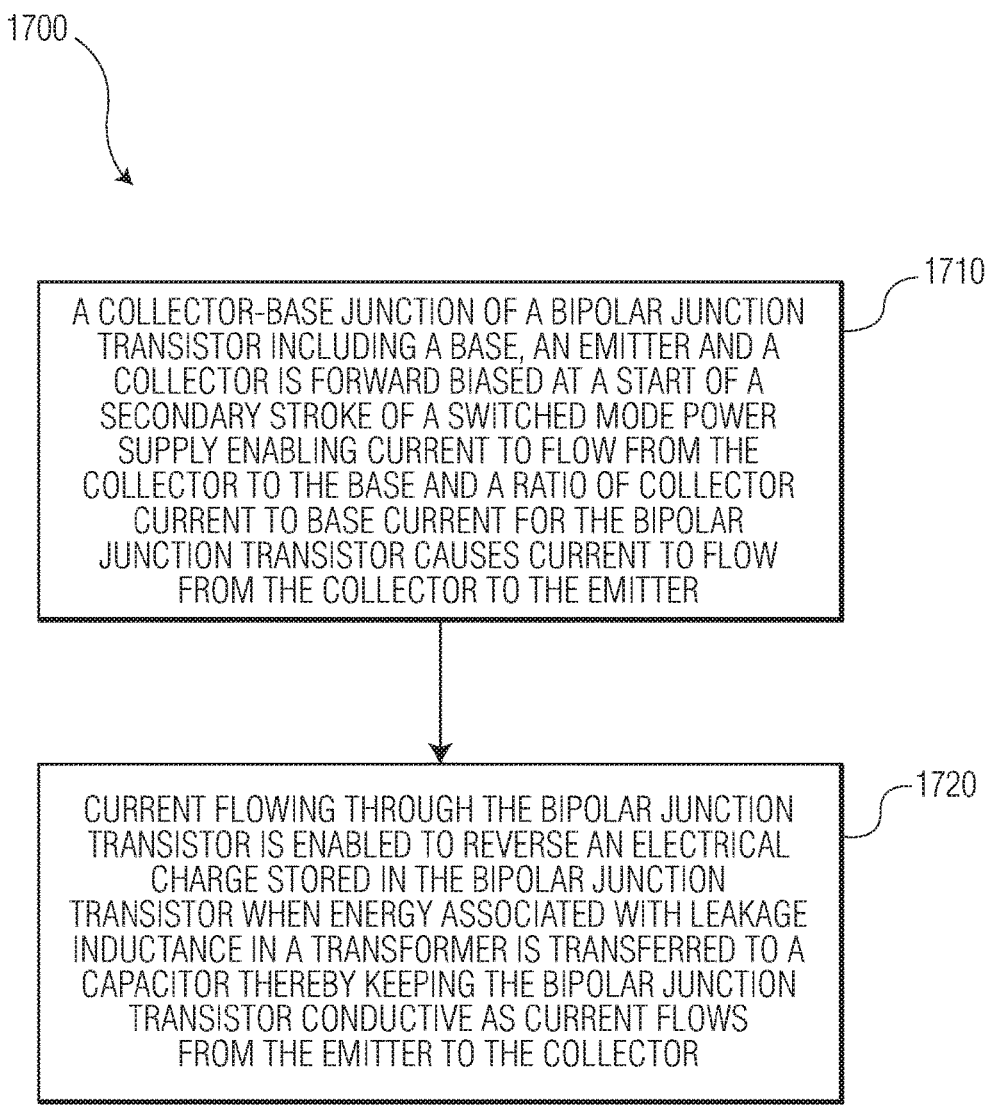
FIG. 17 depicts a flow diagram for a method of operating a switched mode power.

Referring to FIG. 17, depicted is a flow diagram 1700 for a method of operating a switched mode power. Referring to Block 1710, a collector-base junction of a bipolar junction transistor including a base, an emitter and a collector is forward biased at a start of a secondary stroke of a switched mode power supply enabling current to flow from the collector to the base and a ratio of collector current to base current for the bipolar junction transistor causes current to flow from the collector to the emitter. Then as shown in Block 1720, current flowing through the bipolar junction transistor is enabled to reverse an electrical charge stored in the bipolar junction transistor when energy associated with leakage inductance in a transformer is transferred to a capacitor thereby keeping the bipolar junction transistor conductive as current flows from the emitter to the collector. It can be appreciated given the foregoing that the electrical charge stored in the bipolar junction transistor can keep the bipolar junction transistor conductive and operating as an active clamp. Further, a conduction time of the bipolar junction transistor can be dependent on the electrical charge stored in the bipolar junction transistor. Also, a resistor when connected to the collector and at least one diode when connected to the base can operate to reduce storage time of the bipolar junction transistor by limiting collector to base current by deflecting current from the collector-base junction to the at least one diode. Accordingly, a bipolar junction transistor can be turned on to thereby operate as an active clamp circuit by forward biasing a collector-base junction associated with the bipolar junction transistor and to enable a storage charge of the bipolar junction transistor to keep the bipolar junction transistor conductive while the collector-base junction bias is reversed.

Although specific embodiments of the invention have been described and illustrated, the invention is not to be limited to the specific forms or arrangements of parts so described and illustrated. The scope of the invention is to be defined by the claims appended hereto and their equivalents.

The invention claimed is:

1. A switched mode power supply, comprising:
a series connection of a bipolar junction transistor, said bipolar junction transistor including a collector, a base, an emitter, and a capacitor configured as an active clamp circuit and adapted to turn on the bipolar junction transistor by forward biasing a collector-base junction associated with the bipolar junction transistor.

2. The switched mode power supply of claim 1, further comprising a drain for a low side switch driven by a control IC, the drain also being connected with a first end connection of a primary winding of a transformer and the active clamp circuit.

3. The switched mode power supply of claim 1, wherein a storage charge of the bipolar junction transistor keeps the bipolar junction transistor conductive and operating as an active clamp.

4. The switched mode power supply of claim 1, wherein a conduction time of the bipolar junction transistor is dependent on a storage charge of the bipolar junction transistor.

5. The switched mode power supply of claim 1, further comprising the bipolar junction transistor having a shorted base and emitter.

6. The switched mode power supply of claim 1, further comprising:
a first resistor connected with a first end to the collector; and
at least one diode including an anode and a cathode, the at least one diode connected with the anode to a second end of the first resistor and connected with the cathode to the base.

7. The switched mode power supply of claim 6, wherein the first resistor and the at least one diode operate to reduce charge storage time of the bipolar junction transistor by deflecting current from the collector-base junction to the at least one diode.

8. The switched mode power supply of claim 6, further comprising a second resistor connected in parallel with the capacitor.

9. The switched mode power supply of claim 1, further comprising:
the collector connected in series with the capacitor to a first end connection of a primary winding of a transformer;
the emitter connected to at least one of a ground or to an input voltage and a second end connection of the primary winding; and
the base connected to the emitter.

10. The switched mode power supply of claim 1, further comprising:
the emitter connected in series with the capacitor to a first end connection of a primary winding of a transformer;
the collector connected to at least one of a ground or to an input voltage and a second end connection of the primary winding; and
the base connected to the emitter.

11. The switched mode power supply of claim 1, wherein the base of the bipolar junction transistor is connected to the emitter by a first resistor.

12. A switched mode power supply, comprising:
a bipolar junction transistor including a collector, a base and an emitter, the bipolar junction transistor connected in series with a capacitor configured as an active clamp circuit and adapted to turn on the bipolar junction transistor by forward biasing of a collector-base junction associated with the collector and the base of the bipolar junction transistor;
a first end of a first resistor connected to the collector; and
at least one diode including an anode and a cathode, the at least one diode connected with the anode to a second end of the first resistor and the at least one diode connected with the cathode to the base.

13. The switched mode power supply of claim 12, wherein a storage charge of the bipolar junction transistor keeps the bipolar junction transistor conductive and operating as an active clamp.

14. The switched mode power supply of claim 13, further comprising:
the collector connected in series with the capacitor to a first end connection of a primary winding of a transformer;

the emitter connected to at least one of a ground or to an input voltage and a second end connection of the primary winding; and the base connected to the emitter.

15. The switched mode power supply of claim 13, further comprising:

the emitter connected in series with the capacitor to a first end connection of a primary winding of a transformer;

the collector connected to at least one of a ground or to an input voltage and a second end connection of the primary winding; and the base connected to the emitter.

16. A method of operating a switched mode power supply, comprising:

forward biasing a collector-base junction of a bipolar junction transistor including a base, an emitter and a collector at a start of a secondary stroke of a switched mode power supply enabling current to flow from the collector to the base, wherein a ratio of collector current to base current for the bipolar junction transistor causes current to flow from the collector to the emitter; and enabling current flowing through the bipolar junction transistor to reverse an electrical charge stored in the bipolar junction transistor when energy associated with leakage inductance in a transformer is transferred to a capacitor thereby keeping the bipolar junction transistor conductive as current flows from the emitter to the collector.

17. The method of claim 16, wherein the electrical charge stored in the bipolar junction transistor keeps the bipolar junction transistor conductive and operating as an active clamp.

18. The method of claim 16, wherein a conduction time of the bipolar junction transistor is dependent on the electrical charge stored in the bipolar junction transistor.

19. The method of claim 16, wherein a resistor connected to the collector and at least one diode connected to the base operate to reduce storage time of the bipolar junction transistor by limiting current from the collector to the base by deflecting the current from the collector-base junction to the at least one diode.

20. The method of claim 16, wherein the bipolar junction transistor is turned on to thereby operate as an active clamp circuit by forward biasing the collector-base junction associated with the bipolar junction transistor to enable a storage charge of the bipolar junction transistor to keep the bipolar junction transistor conductive while bias of the collector-base junction is reversed.

* * * * *